(12) United States Patent
Lee et al.

(10) Patent No.: US 12,117,967 B2
(45) Date of Patent: Oct. 15, 2024

(54) METHOD AND APPARATUS FOR PARSING LOG DATA

(71) Applicant: SAMSUNG SDS CO., LTD., Seoul (KR)

(72) Inventors: Hee Suk Lee, Seoul (KR); Kyong Hyon Park, Seoul (KR); Young Do Kim, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 226 days.

(21) Appl. No.: 17/836,059

(22) Filed: Jun. 9, 2022

(65) Prior Publication Data

US 2023/0040539 A1    Feb. 9, 2023

(30) Foreign Application Priority Data

Aug. 6, 2021    (KR) .......................... 10-2021-0103838

(51) Int. Cl.
*G06F 16/00* (2019.01)
*G06F 11/34* (2006.01)
*G06F 16/17* (2019.01)

(52) U.S. Cl.
CPC ...... *G06F 16/1734* (2019.01); *G06F 11/3476* (2013.01)

(58) Field of Classification Search
CPC .................................................. G06F 16/1734
USPC ......................................................... 707/802
See application file for complete search history.

(56) References Cited

U.S. PATENT DOCUMENTS

| 8,380,752 | B2* | 2/2013 | Botros | G06F 16/9038 |
| | | | | 707/802 |
| 11,113,064 | B2* | 9/2021 | Rouse | G06F 9/3824 |
| | | | | 707/707 |
| 2019/0005111 | A1* | 1/2019 | Kilje | G06F 40/221 |
| | | | | 707/707 |
| 2021/0042386 | A1* | 2/2021 | Chou | G06F 16/901 |
| | | | | 707/707 |
| 2021/0209163 | A1* | 7/2021 | Boxwell | G06F 40/30 |
| | | | | 707/707 |
| 2021/0216509 | A1* | 7/2021 | Jayanthi | G06F 16/1734 |
| | | | | 707/707 |
| 2022/0207163 | A1* | 6/2022 | Gentleman | G06F 21/62 |
| | | | | 707/707 |

FOREIGN PATENT DOCUMENTS

| CN | 101286891 B | 11/2010 |
| CN | 106055703 A | 10/2016 |
| CN | 109582551 A | 4/2019 |
| CN | 111949627 A | 11/2020 |

(Continued)

*Primary Examiner* — Alexandria Y Bromell
(74) *Attorney, Agent, or Firm* — Sughrue Mion, PLLC (57) ABSTRACT

A method for parsing log data according to an embodiment of the present disclosure includes loading a plurality of unit logs identified by first parsing log data into a memory in a two-dimensional matrix, wherein the unit log includes a plurality of items and constitutes one row, determining a target item to be second parsed among the items loaded into the memory, dividing data of the target item into a plurality of sub-items by second parsing the data of the target item, among the items loaded into the memory in the two-dimensional matrix and storing a second parsing result including the plurality of sub-items.

14 Claims, 9 Drawing Sheets

(56) References Cited

FOREIGN PATENT DOCUMENTS

| KR | 10-2012-0003567 A | 1/2012 |
|----|-------------------|--------|
| KR | 10-1826828 B1     | 3/2018 |
| KR | 10-2020-0026852 A | 3/2020 |

* cited by examiner

| size of a log file (the number of lines) | parsing performance of the present disclosure (second) | parsing performance of goaccess (second) | result |
|---|---|---|---|
| 0.5GB (729,832 lines) | 29.71 | 25.35 | similar |
| 1GB (1,459,665 lines) | 55.24 | 61.22 | similar |
| 2GB (2,919,330 lines) | 123.06 | 158.97 | superior |
| 4GB (5,838,661 lines) | 298.68 | 524.02 | superior |
| 8GB (11,677,322 lines) | 661.12 | 1,458.45 | superior |

METHOD AND APPARATUS FOR PARSING LOG DATA

CROSS-REFERENCE TO RELATED APPLICATION AND CLAIM OF PRIORITY

This application claims the benefit under 35 USC § 119 of Korean Patent Application No. 10-2021-0103838 filed on Aug. 6, 2021, in the Korean Intellectual Property Office, the entire disclosure of which is incorporated herein by reference for all purposes.

BACKGROUND

1. Technical Field

The present disclosure relates to a method and apparatus for parsing log data. More particularly, the present disclosure relates to a method and apparatus for quickly parsing a large amount of log data to facilitate analysis.

2. Description of the Related Art

Log data refers to data collected to handle faults and perform the tuning of a computing device in operation. The log data may be collected when a request is received from a client. The log data includes a logging date and time, a user Internet Protocol (IP) address, a request Uniform Resource Locator (URL), a Hypertext Transfer Protocol (HTTP) response code, the size of response data, and the processing time.

By analyzing such log data, it is possible to detect a pattern of a Uniform Resource Identifier (URI) by a user request at a certain time or to analyze anomalies (a delay in requested processing time, certain IP concentrations, etc.). However, for such a meaningful analysis, it should be possible to parse the log data in item units.

However, the log data may be composed of numerous lines, and in this case, it may take a long time to parse the log data. In addition, the memory needs to be frequently accessed to parse the log data, which causes an increase in the number of memory accesses.

SUMMARY

Technical aspects to be achieved through one embodiment by the present disclosure provide a method and apparatus for quickly parsing a large amount of log data to facilitate analysis.

Other technical aspects to be achieved through one embodiment by the present disclosure provide a method and apparatus for parsing log data that minimize the number of function calls and the number of memory accesses in the process of parsing the log e data.

Another technical aspect to be achieved through one embodiment by the present disclosure provides a method and apparatus for parsing log data that quickly select and parse items required for the log data.

The technical aspects of the present disclosure are not restricted to those set forth herein, and other unmentioned technical aspects will be clearly understood by one of ordinary skill in the art to which the present disclosure pertains by referencing the detailed description of the present disclosure given below.

According to the present disclosure, a method for parsing log data performed by a computing device may comprise, loading a plurality of unit logs identified by first parsing log data into a memory in a two-dimensional matrix, wherein the unit log comprises a plurality of items and constitutes one row, determining a target item to be second parsed among the items loaded into the memory, dividing data of the target item into a plurality of sub-items by second parsing the data of the target item, among the items loaded into the memory in the two-dimensional matrix and storing a second parsing result including the plurality of sub-items.

In some embodiments, the dividing of data of the target item into a plurality of sub-items may comprise, identifying a range of columns to be second parsed in the second two-dimensional matrix and second parsing the data of the target item included in the identified range of columns, in succession, from a first row to a last row of the two-dimensional matrix, wherein the second parsing is performed using the data of the target item loaded into the memory.

In some embodiments, the storing of a second parsing result may comprise merging and storing the plurality of sub-items and items that are not the target items, in column units.

In some embodiments, the storing of a second parsing result may comprise generating a separate file and recording the merged result in the separate file.

In some embodiments, the storing of a second parsing result may comprise generating a separate file and recording the merged result in the separate file.

In some embodiments, the loading of a plurality of unit logs into a memory in a two-dimensional matrix may comprises, identifying a log format that corresponds to a type of the log data, determining an item indexed from the log format as a necessary item and first parsing the unit log including the determined necessary item and loading the unit log into the memory.

In some embodiments, the method for parsing log data further may comprise, determining whether IP logging information including IP addresses of routing hops is included in the log data and in response to the determination that the logging information is included in the log data, removing a distinguisher for distinguishing the IP addresses from the IP logging information.

In some embodiments, the target item is an item in which a year, month, day and hour are recorded and dividing the item of the year, month, day and hour into two or more sub-items, among a first sub-item for recording the year, a second sub-item for recording the month, a third sub-item for recording the day and a fourth sub-item for recording the hour.

In some embodiments, the determining of a target item to be second parsed may comprise, providing a user with one or more items capable of the second parsing, among the items first parsed and loaded into the memory and determining an item selected by the user from the provided one or more items, as the target item to be second parsed.

According to another aspect of the present disclosure, a computing device, may comprise, one or more processors, a memory configured to load a computer program executed by the processor and a storage configured to store the computer program, wherein the computer program comprises instructions for performing operations of loading a plurality of unit logs identified by first parsing log data into a memory in a two-dimensional matrix, wherein the unit log comprises a plurality of items and constitutes one row, determining a target item to be second parsed among the items loaded into the memory, dividing data of the target item into a plurality of sub-items by second parsing the data of the target item, among the items loaded into the memory in the two-dimensional matrix and storing a second parsing result including the plurality of sub-items.

BRIEF DESCRIPTION OF THE DRAWINGS

The above and other aspects and features of the present disclosure will become more apparent by describing in detail exemplary embodiments thereof with reference to the attached drawings, in which:

FIG. 7 is a view illustrating merged items:

DETAILED DESCRIPTION

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

In adding reference numerals to the components of each drawing, it should be noted that the same reference numerals are assigned to the same components as much as possible even though they are shown in different drawings. In addition, in describing the present disclosure, when it is determined that the detailed description of the related well-known configuration or function may obscure the gist of the present disclosure, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the disclosure. In this specification, the singular also includes the plural unless specifically stated otherwise in the phrase.

In addition, in describing the component of this disclosure, terms, such as first, second, A, B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

Figure 1:
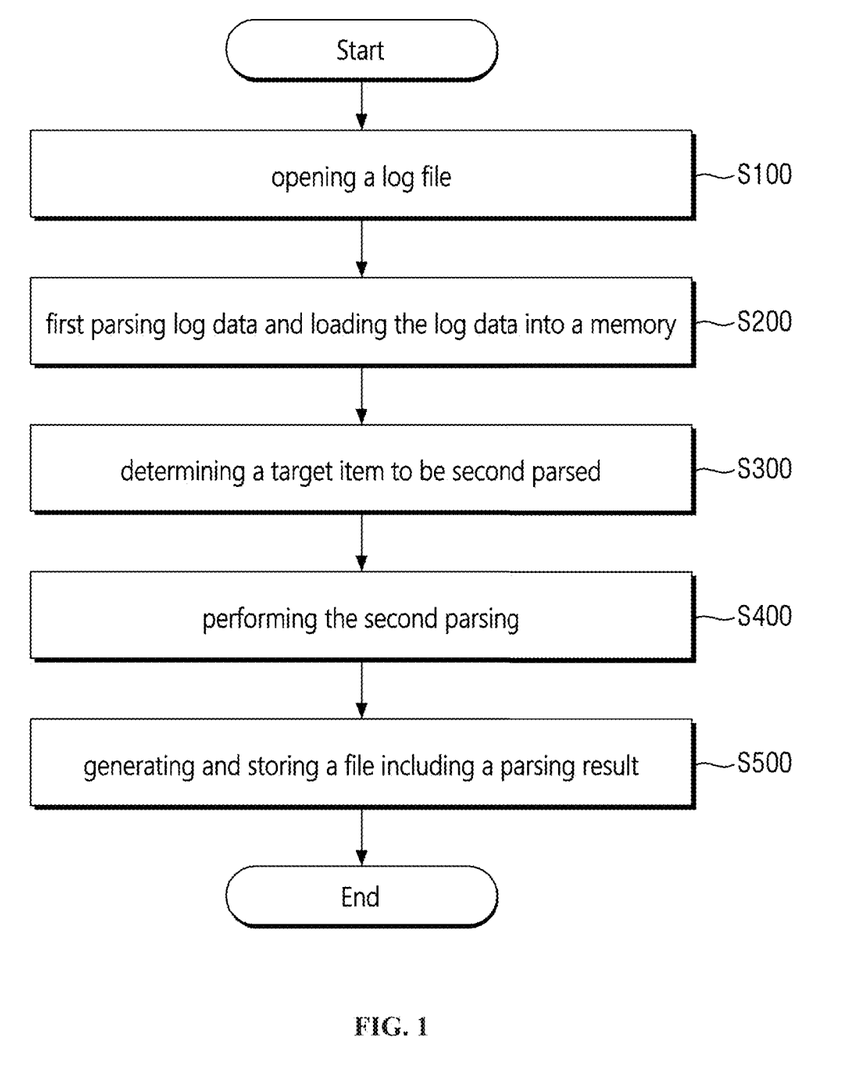
FIG. 1 is a flowchart illustrating a method for parsing log data according to one embodiment of the present disclosure.

Hereinafter, embodiments of the present disclosure will be described with reference to the attached drawings:

FIG. 1 is a flowchart illustrating a method for parsing log data according to one embodiment of the present disclosure.

Each step of the method illustrated in FIG. 1 may be performed by the computing device. In other words, each step of the present method may be implemented with one or more instructions executed by a processor of the computing device. First steps included in the present method may be performed by a first computing device, and second steps of the present method may be performed by a second computing device. Hereinafter, a further description will be continued assuming that each step of the present method is performed by one computing device; however, the subject of performing each step is only an example, and the present disclosure is not limited to the following description. For the convenience of explanation, the description of the subject of performing some steps included in the method may be omitted.

Referring to FIG. 1, a log file may be opened to acquire the log data included in the log file (S100). The log data is included in the log file, and a plurality of raw unit logs are included in the log data. Herein, the raw unit logs may be data collected when requested by a client. The raw unit logs may include a plurality of items. The items may include a logging date and time, a user IP, a request URL, an HTTP response code, size of response data, a required time for processing, a number of transmitted bytes, a requested file name, a query string included in the request, a required time to process the request, a cookie value included in the request, and a value of a header name included in the request. Each of the raw unit logs may be divided into rows and included in the log data. Alternatively, the raw unit logs are not divided into rows, and each of the raw unit logs may be included in log data in succession.

In some embodiments, the raw unit logs may include IP logging information including IP addresses of routing hops. In this case, the computing device may determine whether or not the IP logging information including the IP addresses of the routing hops is included in the log data. In response to the determination that the IP logging information is included in the log data, the computing device may remove a distinguisher for distinguishing the IP address from the IP logging information of the raw unit logs. Herein, the distinguisher may be a space or a comma. In detail, the IP addresses of the routing hops in addition to source IP addresses may be included and recorded in the raw unit logs of the log data. In this case, in order to facilitate parsing, the computing device may preprocess the log data by removing the distinguisher (e.g., a comma or a space) for distinguishing the hop IP address. In other words, the computing device may previously perform an operation of removing the distinguisher between the hop IP addresses that may cause errors and a decrease in speed during parsing.

Next, a plurality of processing unit logs may be extracted from the plurality of raw unit logs by first parsing the log data, and the plurality of extracted processing unit logs may be loaded into a memory in a two-dimensional matrix (S200). Herein, the processing unit log may be a unit log in which only necessary items are selected from the raw unit log. In other words, the processing unit log may be data including only items necessary for analysis among items included in the raw unit log. The step S200 of first parsing the raw log data and loading the raw log data into the memory will be described in detail with reference to FIGS. 2 to 4.

Next, a target item to be second parsed may be determined among a plurality of processing unit logs loaded into the memory (S300). In one embodiment, among two-dimensional matrix-shaped data (i.e., the processing unit logs) loaded into the memory, a range of columns indicating the second parsing may be identified, and the target item included in the identified range of the columns may be determined as a two-dimensional target item.

In addition, the second parsing may be performed for each of the determined target items (S400). In one embodiment, the computing device may second parse data that correspond to the target item among the two-dimensional shaped data loaded into the memory. In other words, the computing device may second parse the target item included in the range of columns from a first row to a last row in succession, among the two-dimensional shaped data loaded into the memory. When the second parsing is completed, the target item may be divided into a plurality of sub-items. The step S400 of performing the second parsing will be described in detail with reference to FIG. 5.

Next, a parsing result may be stored (S500). In one embodiment, some items of the first parsing result may be merged with sub-items of the second parsing result, and a file including the merged result may be generated. The step S500 of storing the parsing result will be described in detail with reference to FIGS. 6 and 7.

Hereinafter, the step S200 of FIG. 1 will be described in detail with reference to FIGS. 2 to 4.

Figure 2:
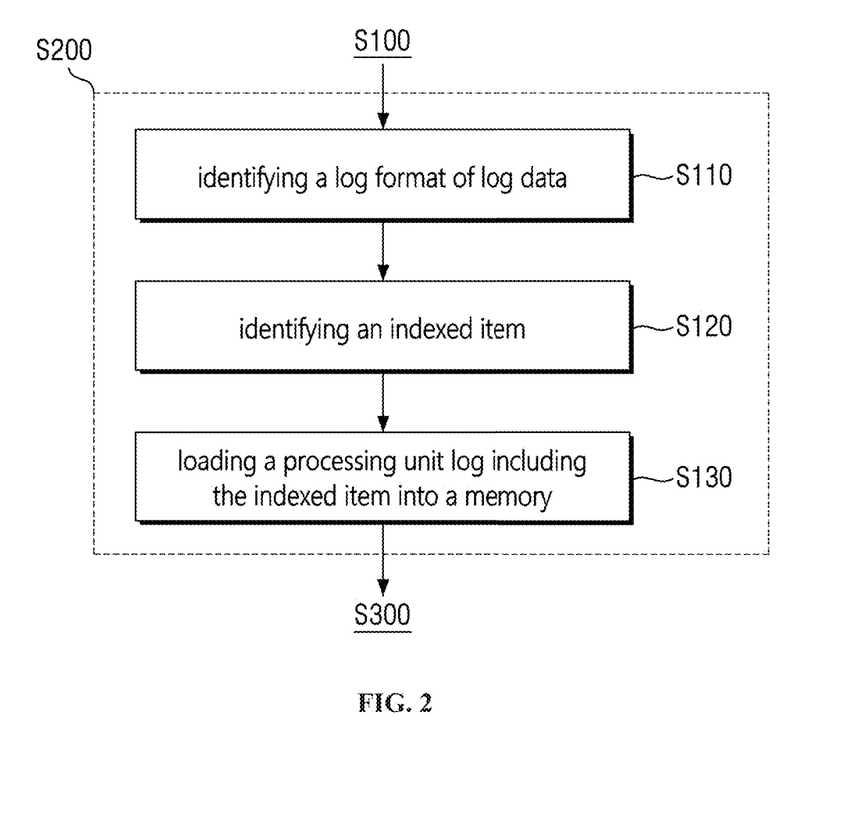
FIG. 2 is a view for explaining a step S200 of FIG. 1 in detail.
Figure 3:
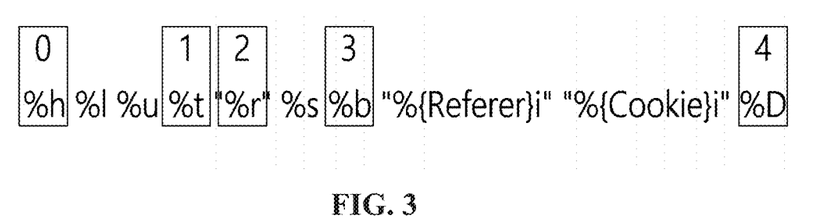
FIG. 3 is a view illustrating a log format.

Referring to FIG. 2, a log format that corresponds to a type of log data may be identified (S110). The log format provides an order of each item recorded in log data, a definition of the items, and a definition of a distinguisher for distinguishing between each of the items, and the computing device may pre-store log formats that are different for each type of log data. On the other hand, when the log data to be parsed is a new type, a new log format that corresponds to the type of log data may be generated and stored in a computing device FIG. 3 is a view illustrating a log format, and as illustrated in FIG. 3, the log format may define information on what a series of items recorded in the raw unit log mean. In FIG. 3, "% h" may mean an IP address of a remote host, "% l" may mean a remote login name, "% u" may mean a remote user name, "% t" may mean a date and time requested from the host, "% or" may mean a user request method (e.g., GET, POST, etc.) and URL, and "% s" may mean a server response to the request (e.g., HTTP status code, 200, 300, etc.), "% b" may mean the number of transmission bytes, "%{Referer}i" may mean a requested URL, "%{Cookie}i" may mean a requested cookie value, and "% D" may mean the time taken to process the request.

Next, one or more items indexed in the log format may be identified (S120). According to one embodiment, the one or more items may be indexed in the log format, and the computing device may identify the one or more items indexed in the log format. Herein, items required for analysis may be indexed in the log format. In FIG. 3, it is illustrated that "% h" indicating the IP address of the remote host is index 0, "% t" indicating the date and time of receiving the request from the host is index 1, "% r" indicating the user request method and URL is index 2, "% b" indicating the number of transmission bytes is index 3, and "% D" indicating the time taken to process the request is index 4.

In addition, the indexed items may be identified by first parsing the log data, and a plurality of processing unit logs including the identified indexed items may be loaded into the memory (S130). The processing unit logs loaded into the memory may be distinguished from each other by rows and may be configured in the two-dimensional matrix. In detail, the log data may include the plurality of raw unit logs, and the computing device may perform the first parsing to distinguish the raw unit logs included in the log data from each other. Furthermore, the computing device may select only the items (i.e., necessary items) indexed in each of the raw unit logs, and the processing unit log including the selected items may be loaded into the memory. In other words, the raw unit logs included in the log data are not unchangeably mounted into the memory, but the processing unit logs including only necessary items are loaded into the memory.

Figure 4:
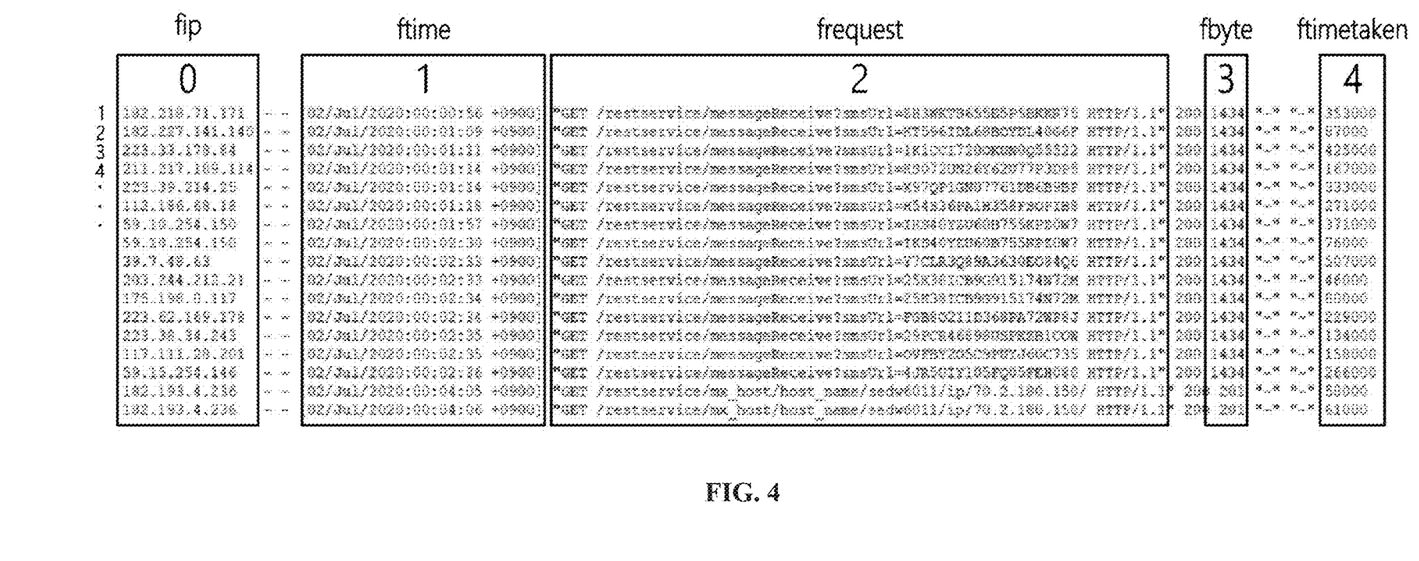
FIG. 4 is a view illustrating a large number of processing unit logs loaded in a memory and having a two-dimensional matrix form.

FIG. 4 is a view illustrating a large number of processing unit logs loaded in a memory and having a two-dimensional matrix form.

As illustrated in FIG. 4, the processing unit logs may have an n*m matrix structure. Furthermore, each of the processing unit logs may be distinguished from each other by rows. In addition, as illustrated in FIG. 4, the processing unit log loaded into the memory may be loaded into the memory by including only pre-indexed items without including all items included in the raw unit logs.

Referring to FIG. 4, the processing unit logs include index 0 (fip) indicating the IP address of the remote host, index 1 (ftime) indicating the date and time of receiving the request from the host, index 2 (frequest) indicating the user request method and the URL, index 3 (fbyte) indicating the number of transmission bytes, and index 4 (ftimetaken) indicating the time taken to process the request.

According to the present embodiment, the processing unit logs including only the items necessary for analysis are mounted in the memory, thereby not only reducing memory space, but also processing the second more quickly.

Figure 5:
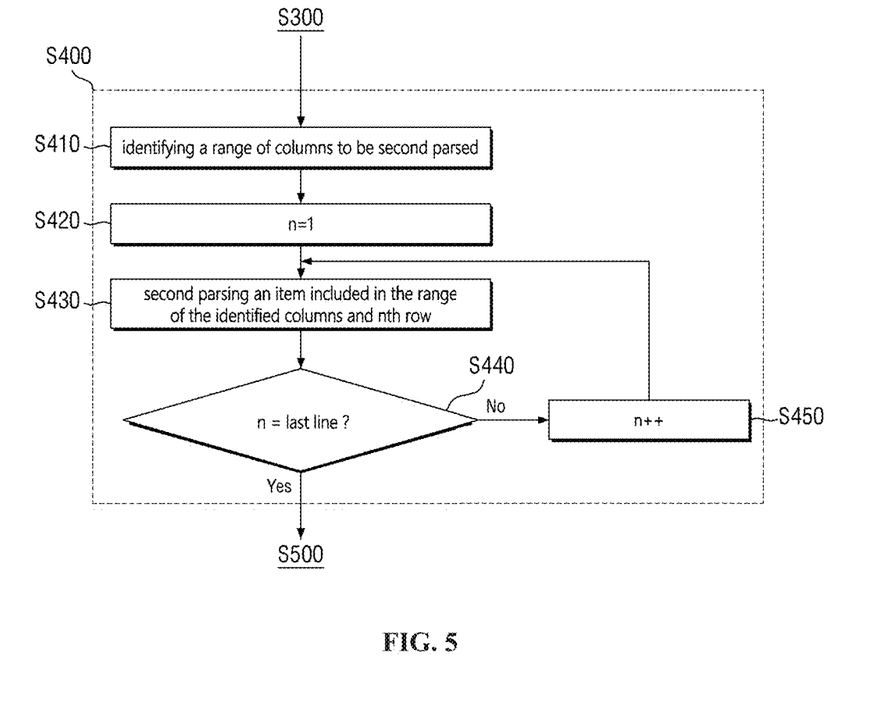
FIG. 5 is a view for explaining a step S300 of FIG. 1 in detail.

FIG. 5 is a view for explaining a step S300 of FIG. 1 in detail.

Referring to FIG. 5, the range of columns to be second parsed may be identified (S410). The range of columns may be preset for each log format in advance. In another embodiment, the item to be second parsed may be predefined for each log format, and the computing device may identify the range of columns to be second parsed by identifying the range of columns including the item to be second parsed.

In another embodiment, an item list (hereinafter, referred to as a "second parsing target item list") in which the items to be second parsed are recorded may be stored in advance. For example, the second parsing target item list may include an item related to a date and time, an item related to an IP address of the routing hop, and an item related to a file name and an extension. When there is the item recorded in the second parsing target item list among the first parsed items, the computing device may inform the user that the items may be second parsed. In this case, after displaying a notification message (or menu) on a screen, including one or more items to be second parsed among the first parsed items or transmitting the notification message to a user terminal, the computing device may determine an item selected by the user from the items included in the notification message as an item to be second parsed, and may identify the range of columns including the determined item as the columns to be second parsed.

In addition, after "n" indicating the order of rows is initially set to "1" (S420), data of the target item included in the identified range of the column may be second parsed in the $n^{th}$ row, thus dividing the data of the target item into a plurality of sub-items (S430). For example, when the target item is an item indicating a year, month, day and hour, the target item may be divided into two or more sub-items among a first sub-item for recording the year, a second sub-item for recording the month, a third sub-item for recording the day, and a fourth sub-item for recording the hour. In this case, the second parsing is performed using the data of the target item previously loaded into the memory. In other words, instead of loading the data of the target item back into the memory, the second parsing is performed using the data of the target item previously loaded into the memory in the two-dimensional matrix form so that the speed of the second parsing can be improved.

Next, it may be determined whether "n" indicating the order of rows coincides with a last line of the two-dimensional matrix loaded into the memory (S440). When "n" corresponds to the last line (i.e., when the second parsing for all lines is completed), the step S500 may be advanced.

On the other hand, when "n" is not determined to correspond to the last line, data of the target item corresponding to the range of the column specified in the next row may be second parsed by increasing n by one and performing the step S430 again.

According to the method of FIG. 5, the target items to be second parsed among the processing unit logs loaded into the memory may be second parsed in succession according to the columns. When the processing unit logs loaded into the memory are second parsed in this way, the second parsing may be performed in column units, thereby increasing the speed at the time of parsing a large amount of log data. In other words, only the items included in the columns in a certain range may be second parsed among the processing log data in the two-dimensional matrix form previously loaded into the memory, thereby not only reducing the number of memory accesses in the second parsing process but also decreasing the number of function calls in the parsing process.

Furthermore, in the prior art, when the first parsing and the second parsing are performed for the raw unit log, the first parsed item is identified from the log data and loaded into the memory, and the second parsed item is divided into sub-items to load each of the sub-items into the memory. In other words, in the prior art, the first parsing and second parsing are performed simultaneously in one raw unit log, and a first function used in the first parsing and a second function used in the second parsing are used together, which needs to go through a process of switching the first function for the first parsing and the second function for the second parsing. Accordingly, the number of accesses to the memory increases during the switching of the functions, which reduces the speed of parsing.

On the other hand, according to the present embodiment, in a state that the processing raw data has been already loaded into the memory using the first function used in the first parsing, the items to be second parsed using the second function used in the second parsing may be second parsed in column units, thereby reducing the number of accesses to the memory and the number of function calls and increasing the speed at the time of handling a large amount of log data.

Hereinafter, referring to FIGS. 6 and 7, the step S500 of FIG. 1 will be described in detail.

Figure 6:
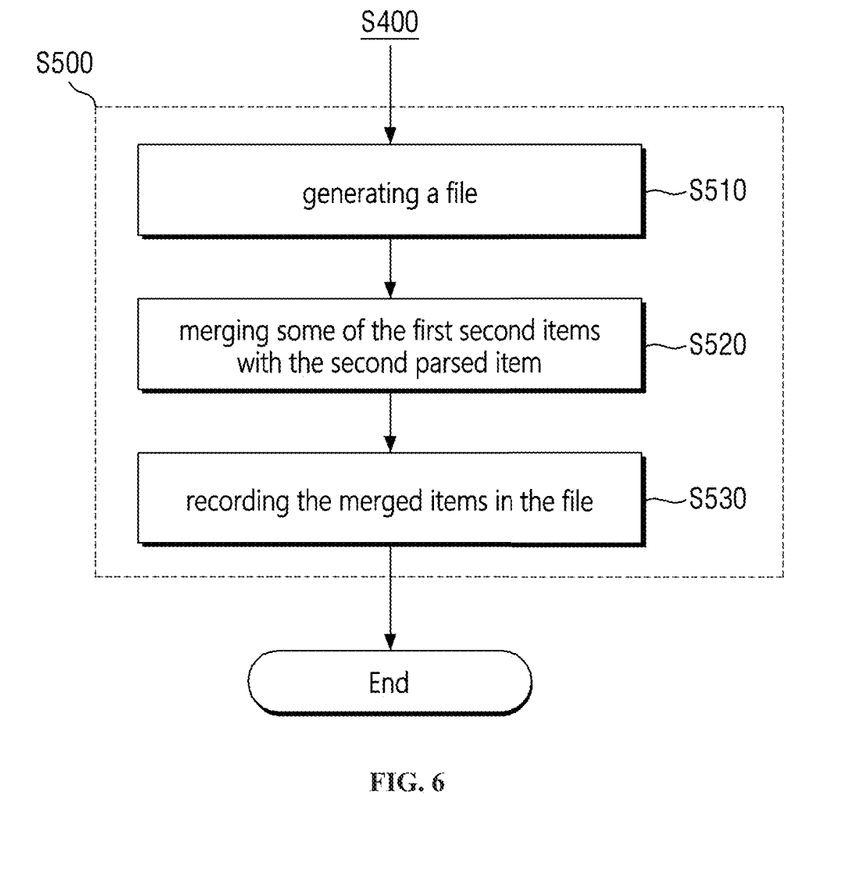
FIG. 6 is a view for explaining a step S500 of FIG. 1 in detail.

Referring to FIG. 6, when the second parsing is completed, a separate file may be generated (S510). The separate file may be a file different from the log file including the raw unit log. In one embodiment, the separate file may be a file in a comma separated value (CSV) format.

In addition, some of the first parsed items may be merged with some of the second parsed sub-items (S520). Herein, some of the first parsed items may be items that are not subject to the second parsing among the first parsed items. In one embodiment, some of the first parsed items and the second parsed sub-items may be merged with each other in column units.

FIG. 7 is a view illustrating merged items. For example, in FIGS. 4 and 7, the item (ftime) included in index 1 may be divided into a first sub-item (fyear) for recoding the a year, a second sub-item (fmonth) for recording the month, a third sub-item (fday) for recording the day, a fourth sub-item (fhour) for recording the hour, a fifth sub-item (fminute) for recording the hour, a sixth sub-item (fsecond) for recording the second, a seventh sub-item (fetime) for recording the year, month and day, an eight sub-item (ftime) recording the minute and second, an ninth sub-item (fdatetime) recording the year, month, day, second, minute and second. In addition, the divided sub-items and some of the first parsed items (i.e., frequest, fip, fbyte, ftime_taken, etc.) may be merged in column units. Such merging in column units improves the speed at which the data is merged. In other words, when the data are merged with each other in rows units one by one, the speed at which the items are merged may be delayed in proportion to the number of rows; however, in the present embodiment, the speed of the merging process may be improved using merging in column units instead of merging in row units.

Next, the items merged in column units may be recorded in the generated file (S530). In another embodiment, the computing device may finally merge the sub-items and some of the first parsed items by recording the items in the file in column units. For example, in FIG. 7, the column corresponding to a fextension item from the column corresponding to a sub-item of fyer may be recorded in the file in succession.

According to the present embodiment, the second parsed sub-items and the first parsed items may be merged with each other in column units, thereby improving the speed of the process of merging the items and further improving the speed at which the second parsing result is generated.

Figure 8:
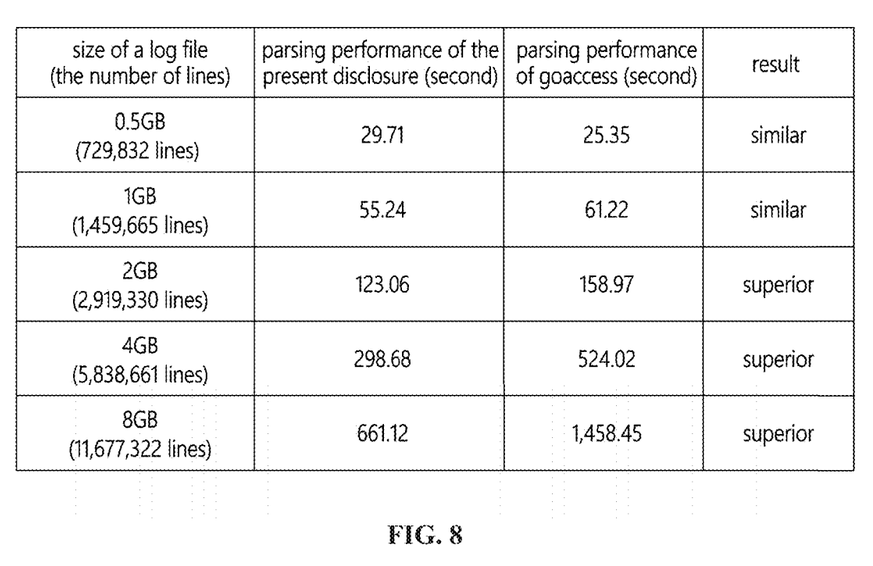
FIG. 8 is a view for comparing a parsing result according to the present embodiment with a conventional parsing technology.

FIG. 8 is a view for comparing a parsing result according to the present embodiment with a conventional parsing technology.

In the present test environment, the parsed log data was applied equally to all steps, and the time from loading the log data into the memory to generating the file was measured. A server with a 3.3 GHz CPU and a 16-gigabyte memory was used during the test process, and a GoAccess version 1.4.6 was used as a conventional art.

Referring to FIG. 8, when a difference in performance of the present server and GoAccess is within 10 seconds, the result is recorded as "similar," and when the difference is 10 seconds or more, it is recorded as "dominant".

As illustrated in FIG. 8, it is found that when the size of log data (i.e., log file) is 1 gigabyte or less, the parsing performance of the present embodiment is similar to that of GoAccess, but when the size of log data is 2 gigabytes or more, the parsing performance of this embodiment is superior to that of GoAccess.

Figure 9:
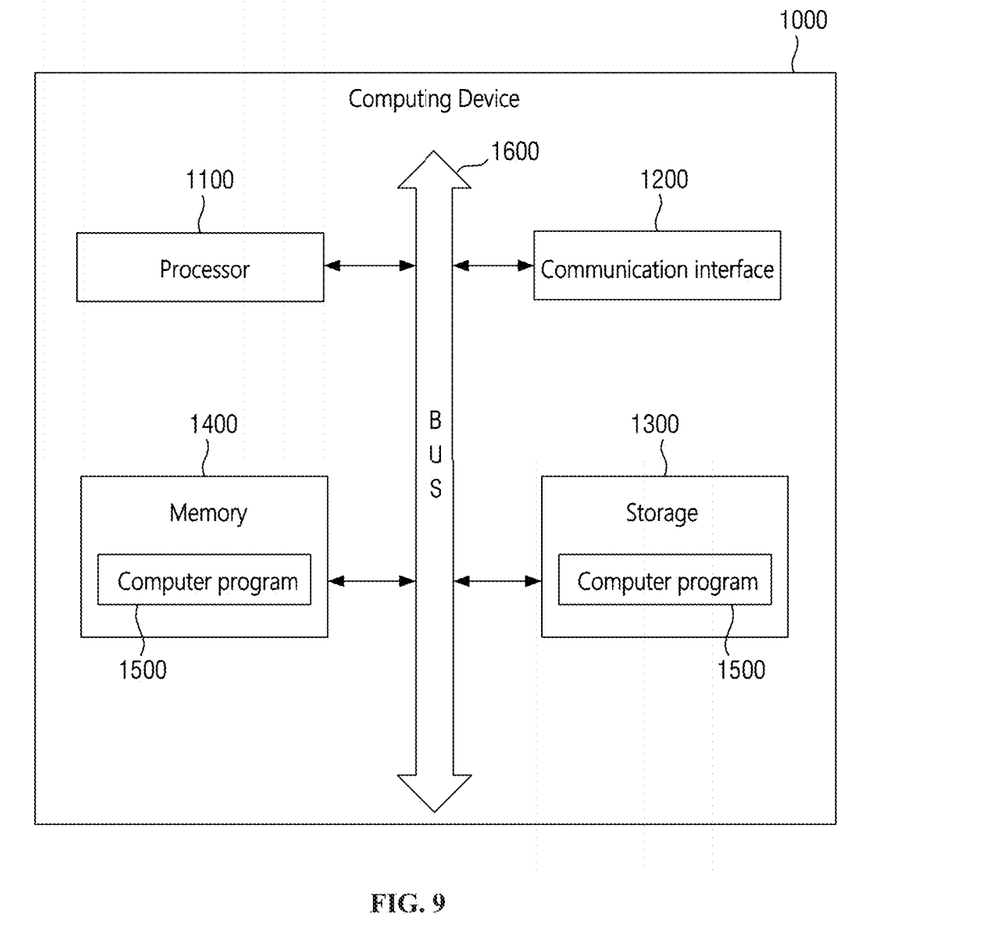
FIG. 9 is an exemplary view illustrating a hardware configuration that can implement a computing device in a variety of embodiments.

FIG. 9 is an example hardware diagram illustrating a computing device 1000. As shown in FIG. 9, the computing device 1000 may include one or more processors 1100, a bus 1600, a communication interface 1200, a memory 1400, which loads a computer program 1500 executed by the processors 1100, and a storage 1300 for storing the computer program 1500. However, FIG. 9 illustrates only the components related to the embodiment of the present disclosure. Therefore, it will be appreciated by those skilled in the art that the present disclosure may further include other general purpose components in addition to the components shown in FIG. 9.

The processor 1100 controls overall operations of each component of the computing device 1000. The processor 1100 may be configured to include at least one of a Central Processing Unit (CPU), a Micro Processor Unit (MPU), a Micro Controller Unit (MCU), a Graphics Processing Unit (GPU), or any type of processor well known in the art. Further, the processor 1100 may perform calculations on at least one application or program for executing a method/operation according to various embodiments of the present disclosure. The computing device 1000 may have one or more processors.

The memory 1400 stores various data, instructions and/or information. The memory 1400 may load one or more programs 1500 from the storage 1300 to execute methods/operations according to various embodiments of the present disclosure. An example of the memory 1400 may be a RAM, but is not limited thereto.

The bus 1600 provides communication between components of the computing device 1000. The bus 1600 may be implemented as various types of bus such as an address bus, a data bus and a control bus.

The communication interface 1200 supports wired and wireless internet communication of the computing device 1000. The communication interface 1200 may support various communication methods other than internet communication. To this end, the communication interface 1200 may be configured to comprise a communication module well known in the art of the present disclosure.

The storage 1300 can non-temporarily store one or more computer programs 1500. The storage 1300 may be configured to comprise a non-volatile memory, such as a Read Only Memory (ROM), an Erasable Programmable ROM (EPROM), an Electrically Erasable Programmable ROM (EEPROM), a flash memory, a hard disk, a removable disk, or any type of computer readable recording medium well known in the art.

The computer program 1500 may include one or more instructions, on which the methods/operations according to various embodiments of the present disclosure are implemented. For example, the computer program 1500 may include instructions for executing operations comprising loading a plurality of unit logs identified by first parsing log data into a memory in a two-dimensional matrix, wherein the unit log comprises a plurality of items and constitutes one row, determining a target item to be second parsed among the items loaded into the memory, dividing data of the target item into a plurality of sub-items by second parsing the data of the target item, among the items loaded into the memory in the two-dimensional matrix and storing a second parsing result including the plurality of sub-items.

When the computer program 1500 is loaded on the memory 1400, the processor 1100 may perform the methods/operations in accordance with various embodiments of the present disclosure by executing the one or more instructions.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although operations are shown in a specific order in the drawings, it should not be understood that desired results can be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

In concluding the detailed description, those skilled in the art will appreciate that many variations and modifications can be made to the preferred embodiments without substantially departing from the principles of the present disclosure. Therefore, the disclosed preferred embodiments of the disclosure are used in a generic and descriptive sense only and not for purposes of limitation.

What is claimed is:

1. A method for parsing log data performed by a computing device, the method comprising:

loading a plurality of unit logs identified by first-parsing log data in a two-dimensional matrix into a memory, wherein the log data comprises a plurality of raw unit logs, and each of the plurality of unit logs constitutes one row and comprises items that are parsed from a plurality of items of each of the plurality of raw unit logs;

determining a target item to be second-parsed among the items loaded into the memory;

dividing data of the target item into a plurality of sub-items by second-parsing the data of the target item, among the items loaded in the two-dimensional matrix into the memory; and storing a second-parsing result including the plurality of sub-items, wherein the loading of the plurality of unit logs in the two-dimensional matrix into the memory comprises:

identifying a log format that corresponds to a type of the log data, among pre-stored log formats that are different for each type of log data, wherein the log format provides an order and a definition of each item in a raw unit log of the log data;

determining at least one item that are indexed in the identified log format, the at least one item being a subset of a plurality of items included the raw unit log; and first-parsing a unit log, including the indexed at least one item, and loading the unit log into the memory.

2. The method for parsing log data of claim 1, wherein the dividing comprises:

identifying a range of columns to be second-parsed in the two-dimensional matrix; and second-parsing the data of the target item included in the identified range of columns, in succession, from a first row to a last row of the two-dimensional matrix, wherein the second-parsing is performed using the data of the target item loaded into the memory.

3. The method for parsing log data of claim 1, wherein the storing of the second-parsing result comprises merging and storing the plurality of sub-items and items that are not target items, in column units.

4. The method for parsing log data of claim 3, wherein the storing of the second-parsing result comprises generating a separate file and recording the merged result in the separate file.

5. The method for parsing log data of claim 1, further comprising:
    determining whether Internet Protocol (IP) logging information including IP addresses of routing hops is included in the log data; and
    in response to a determination that the IP logging information is included in the log data, removing a distinguisher for distinguishing the IP addresses from the IP logging information.

6. The method for parsing log data of claim 1, wherein the target item is an item in which year, month, day and hour are recorded; and
    the dividing of the data of the target item into the plurality of sub-items comprises dividing the item of the year, month, day and hour into two or more sub-items among a first sub-item for recording the year, a second sub-item for recording the month, a third sub-item for recording the day and a fourth sub-item for recording the hour.

7. The method for parsing log data of claim 1, wherein the determining of the target item to be second-parsed comprises:
    providing a user with one or more items capable of being second-parsed, among the items first-parsed and loaded into the memory; and
    determining an item selected by the user from the provided one or more items, as the target item to be second-parsed.

8. A computing device, comprising:
    one or more processors;
    a memory configured to load a computer program executed by the one or more processors; and
    a storage configured to store the computer program,
    wherein the computer program comprises instructions for performing operations of:
    loading a plurality of unit logs identified by first-parsing log data in a two-dimensional matrix into the memory, wherein the log data comprises a plurality of raw unit logs, and each of the plurality of unit logs constitutes one row and comprises items that are parsed from a plurality of items of each of the plurality of raw unit logs;
    determining a target item to be second-parsed among the items loaded into the memory;
    dividing data of the target item into a plurality of sub-items by second-parsing the data of the target item, among the items loaded in the two-dimensional matrix into the memory; and
    storing a second-parsing result including the plurality of sub-items,
    wherein the loading of the plurality of unit logs in the two-dimensional matrix into the memory comprises:
    identifying a log format that corresponds to a type of the log data, among pre-stored log formats that are different for each type of log data, wherein the log format provides an order and a definition of each item in a raw unit log of the log data;
    determining at least one item that are indexed in the identified log format, the at least one item being a subset of a plurality of items included the raw unit log; and
    first-parsing a unit log, including the indexed at least one item, and loading the unit log into the memory.

9. The computing device of claim 8, wherein the operation of dividing comprises operations of:
    identifying a range of columns to be second-parsed in the two-dimensional matrix; and
    sequentially second-parsing data of the target item included in the identified range of columns from a first row to a last row of the two-dimensional matrix, wherein the second-parsing is performed using data of the target item loaded into the memory.

10. The computing device of claim 8, wherein the operation of storing the second-parsing result comprises an operation of merging and storing the plurality of sub-items and items that are not target items, in column units.

11. The computing device of claim 10, wherein the operation of storing the second-parsing result comprises an operation of generating a separate file and recording the merged result in the separate file.

12. The computing device of claim 8, further comprising operations of:
    determining whether Internet Protocol (IP) logging information including IP addresses of routing hops is included in the log data; and
    in response to a determination that the IP logging information is included in the log data, removing a distinguisher for distinguishing the IP addresses from the IP logging information.

13. The computing device of claim 8, wherein the target item is an item in which year, month, day and hour are recorded; and
    an operation of dividing the data of the target item into the plurality of sub-items comprises an operation of dividing the item of the year, month, day and hour into two or more sub-items, among a first sub-item for recording the year, a second sub-item for recording the month, a third sub-item for recording the day and a fourth sub-item for recording the hour.

14. The computing device of claim 8, wherein the operation of determining the target item to be second-parsed comprises operations of:
    providing a user with one or more items capable of being second-parsed, among the items first-parsed and loaded into the memory; and
    determining an item selected by the user from the provided one or more items, as the target item to be second-parsed.

* * * * *